Jan. 21, 1930.  E. RICARD  1,744,504
PROCESS OF MANUFACTURE OF ABSOLUTE ALCOHOL
Filed July 3, 1924  3 Sheets-Sheet 2

Patented Jan. 21, 1930

1,744,504

UNITED STATES PATENT OFFICE

ELOI RICARD, OF MELLE, FRANCE, ASSIGNOR, BY MESNE ASSIGNMENTS, TO U. S. INDUSTRIAL ALCOHOL CO., OF NEW YORK, N. Y., A CORPORATION OF WEST VIRGINIA

PROCESS OF MANUFACTURE OF ABSOLUTE ALCOHOL

Application filed July 3, 1924, Serial No. 724,132, and in Belgium July 6, 1923.

The present invention relates to improvements in the process for the manufacture of absolute alcohol by the addition of a substance termed "entraining body", which will form with water a ternary azeotropic mixture having the minimum boiling point. It is known that when there is added to the commercial alcohol to be dehydrated, a body of this kind capable of forming a ternary azeotropic mixture and when this mixture is distilled, the vapors resulting from the distillation will contain the three components of the azeotropic mixture in a constant ratio irrespective of the quantities of the bodies in the reaction which were originally placed in the distilling column. In these conditions, the water can be entirely withdrawn from the mixture, and the column then contains only a binary mixture consisting of absolute alcohol and the entraining body, which mixture is separated by continuing the distillation so that absolute alcohol is finally obtained at the bottom of the column.

It has further been proposed to treat the vapors of the azeotropic mixture which are discharged from the distilling column, and to produce, after condensation, either homogeneous liquid or a liquid which separates into two layers, in order to recover the entraining body and the absolute alcohol contained in the homogeneous liquid or in the liquid consisting of two layers.

The present invention relates to an improvement in the process described in my application Serial No. 688,049, filed January 23, 1924, which consists in the utilization as the entraining liquid of a mixture of liquids which are suitably selected for the purpose, so as to take advantage of the favourable properties of one or more of the said liquids and to eliminate their unfavourable properties, so that on the whole the operation may be carried out with greater facility, or the output of the same may be increased. The application Serial No. 688,049, discloses in general a process for producing absolute alcohol from aqueous alcohol by the addition of an entraining liquid, such, for example, as a petroleum hydrocarbon, the distillation being carried out therewith so as to obtain a condensate which separates into liquid layers, the layer containing the high percentage of entraining liquid being returned to the still, while the layer containing the high percentage of water is first subjected to the action of a dehydrating substance and then returned to the still.

More specifically, the subject matter of my said application, Serial No. 688,049, may be described as follows, and is shown in the accompanying drawings, in which—

In the said application the process as carried out in connection with the several different types of apparatus, is as follows:

*Example I*

In this example the withdrawing body consists of butyl chloride.

Figure 1:
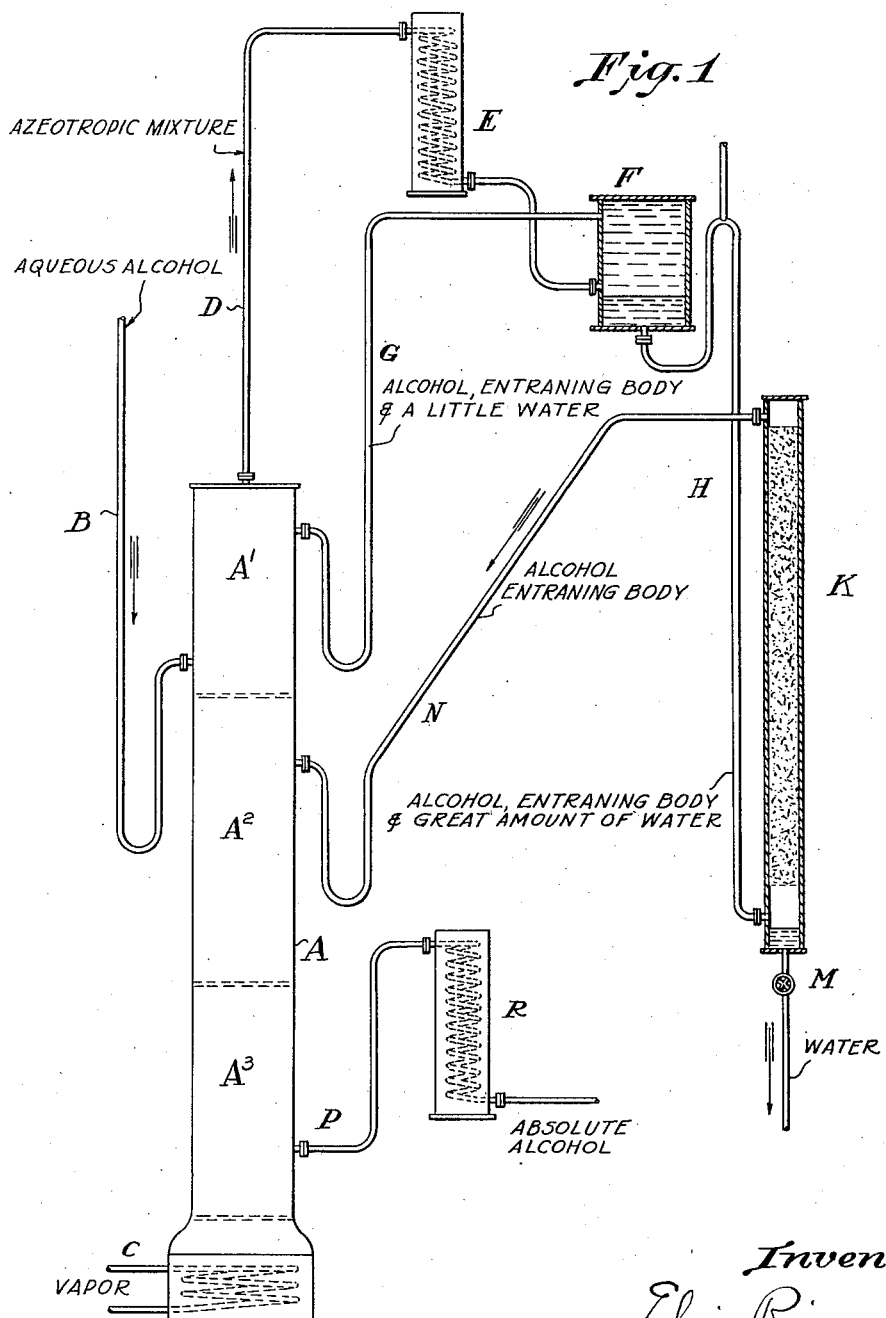
Fig. 1 is a diagrammatic representation of the apparatus used in one example of the invention in said application.

In the distilling column A, Fig. 1, I introduce a quantity of butyl chloride. I then introduce the commercial alcohol to be dehydrated (in the state of liquid or vapor) through the tube B. The withdrawing body and alcohol are introduced preferably in quantities such that the withdrawing body and the water of the alcohol have the ratio given hereinafter in the azeotropic mixture, the alcohol being present in a greater percentage than given in the azeotropic mixture, however. The withdrawing body can also be present in a somewhat greater ratio. The column is heated by means of the worm tube C. The vapor mixture of azeotropic nature is discharged through the conduit D at 63° C. and it has substantially the following percentage composition by volume:

Butyl chloride _____ 76.7
Alcohol _____ 18.5
Water _____ 4.8

The said mixture is condensed in the refrigerating condenser E and collects in the receiver F wherein it separates into two layers. The upper layer represents 87% of the azeotropic mixture and has the percentage composition by volume as follows:

| | |
|---|---|
| Butyl chloride | 87 |
| Alcohol | 11.75 |
| Water | 1.25 |

The lower layer represents 13% of the azeotropic mixture and has the percentage composition by volume as follows:

| | |
|---|---|
| Butyl chloride | 8 |
| Alcohol | 64 |
| Water | 28 |

The upper layer is again caused to enter the column through the conduit G and is subjected to another distillation.

The lower layer proceeds through the conduit H to the dehydrating apparatus K; the dehydrating substance, which may be any of the carbonates of sodium and potassium, sulphates of sodium, sulphates of copper, sulphates of magnesium, etc., withdraws the water in the liquid state, this being discharged through the cock M; the binary mixture of butyl chloride and alcohol is discharged at the upper part and returns to the column through the conduit N during the distillation in the column $A^1$, $A^2$, $A^3$. When distilled, it produces an azeotropic mixture whose boiling point is 65.7° C.

The absolute alcohol is removed as vapor or liquid at P, and is cooled in the refrigerating apparatus R.

Three regions are in fact formed in the column, i. e., the upper region $A^1$ consisting of ternary mixture, the intermediate region $A^2$ consisting of binary mixture, and the lower region $A^3$ consisting of absolute alcohol, from which latter the alcohol is taken off.

*Example II*

In this example the withdrawing body consists of carbon tetrachloride.

Figure 2:
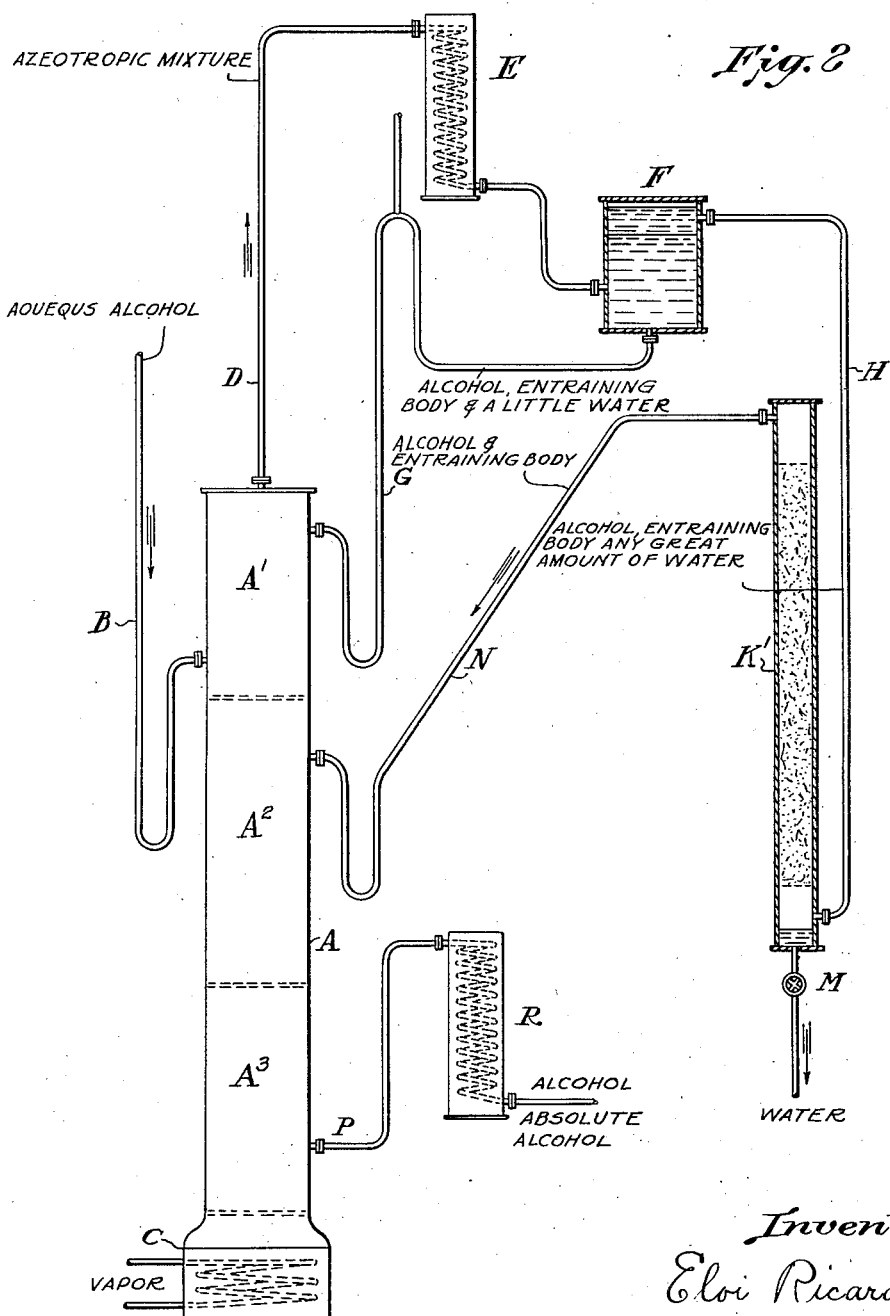
Fig. 2 is a similar view of the apparatus used in another example of said application.

In the distilling column A, Fig. 2, I dispose a quantity of carbon tetrachloride, I then introduce the commercial alcohol to be dehydrated (in the state of liquid or vapor) through the tube B. The withdrawing body and alcohol are introduced preferably in quantities such that the withdrawing body and the water of the alcohol have the ratio given hereinafter in the azeotropic mixture, the alcohol being present in a greater percentage than given in the azeotropic mixture, however. The withdrawing body can also be present in a somewhat greater ratio. The column is heated by the worm tube C. The vapor mixture of an azeotropic nature is discharged through the conduit D at 61.1° C. and it has the following approximate percentage composition by volume:

| | |
|---|---|
| Carbon tetrachloride | 78.10 |
| Alcohol | 17.90 |
| Water | 4.00 |

The said mixture is condensed in the refrigerating condenser E and collects in the receiver F wherein it separates into two layers. The upper layer represents 12.3% of the azeotropic mixture and has the following percentage composition by volume:

| | |
|---|---|
| Carbon tetrachloride | 11 |
| Alcohol | 60 |
| Water | 29 |

The lower layer represents 87.7% of the azeotropic mixture and has the percentage composition by volume as follows:

| | |
|---|---|
| Carbon tetrachloride | 87.5 |
| Alcohol | 12.0 |
| Water | 0.5 |

The lower layer is again caused to enter the column through the conduit $G^1$ and is subjected to another distillation.

The upper layer proceeds through the conduit $H^1$ to the dehydrating apparatus $K^1$; the dehydrating substance withdraws the water in the liquid state which is discharged through the cock M. The dehydrating substance, as above stated, may be any of the carbonates of sodium and potassium, sulphates of sodium, sulphates of copper, sulphates of magnesium, etc. These anhydrous salts are very hygroscopic, and may absorb the water from the liquids with which they are in contact in order to form hydrates; the hydrates themselves will absorb additional quantities of water if the liquids being treated are sufficiently hydrated. In the presence of liquids which are but slightly soluble in water, but are soluble in alcohol, experience shows that the anhydrous salts become hydrated and may even form aqueous solutions; it is this property that is utilized in the present process.

The binary mixture of carbon tetrachloride and alcohol which is situated at the upper part is again brought into the column through the conduit N. When distilled, it produces an azeotropic mixture whose boiling point is 64.5° C. The absolute alcohol is removed as vapor or liquid at P and is cooled in the refrigerating apparatus R.

Three regions are again formed in the column, under the same conditions as stated for Example I.

*Example III*

In this example ethyl acetate is the withdrawing body.

Figure 3:
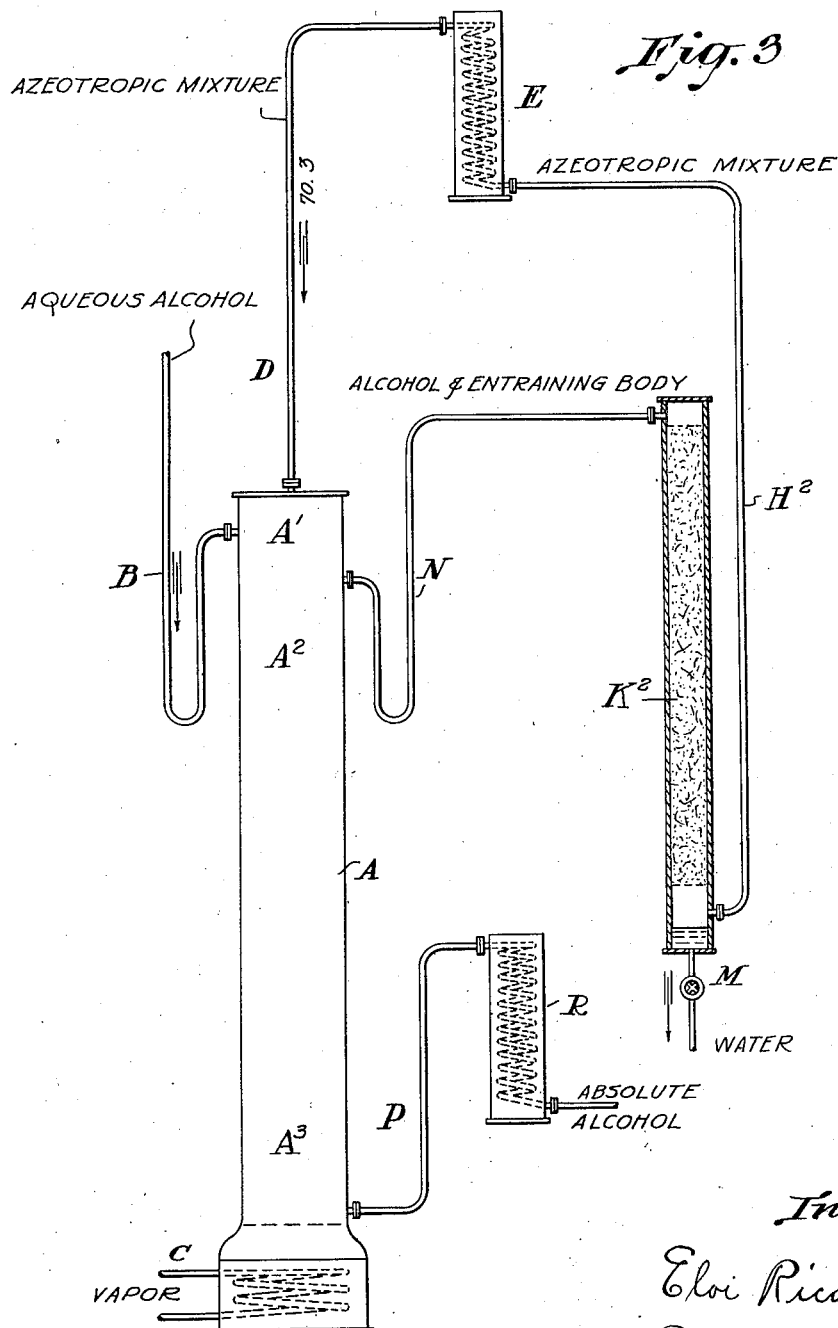
Fig. 3 is a like view of the apparatus used in still another example of said application.

In the distilling column A, Fig. 3, I dispose a quantity of ethyl acetate. I then introduce the commercial alcohol to be dehydrated (in the state of liquid or vapor) through the tube B. The withdrawing body and alcohol are introduced preferably in quantities such that the withdrawing body and the water of the alcohol have the ratio given hereinafter in the azeotropic mixture, the alcohol being present in a greater percentage than given in the azeotropic mixture, however. The withdrawing body can also be present in a somewhat greater ratio. The column is heated by the worm tube C. The vapor mixture of an azeotropic nature is discharged through the conduit D at 70.3° C. and has substantially the following percentage composition:

Ethyl acetate _____ 83.2
Alcohol _____ 9.5
Water _____ 7.3

The said mixture is condensed in the refrigerating condenser E and produces a homogeneous liquid which is discharged through the conduit H² into the dehydrating apparatus K². The dehydrating substance withdraws the water in the liquid state which is discharged through the cock M; the binary mixture of ethyl acetate and alcohol is evacuated at the upper part and is again brought into the column through the conduit N. When distilled, it produces an azeotropic mixture whose boiling point is 71.8° C.

The absolute alcohol is removed as vapor or liquid at P and is cooled in the refrigerating apparatus R.

Three regions are formed in the column, as stated in the case of Example I.

My present invention is an improvement over the invention just described in connection with my application Ser. No. 688,049, and is set forth in the following examples:—

*Example I.*—Benzene when used alone as the entraining body will produce a ternary mixture having the minimum boiling point (about 65° C.) and which separates by condensation into two layers. The bottom layer, which contains the major part of the water in the mixture, represents 16% of the total volume and contains some 32% of water, thus affording, per 100 volumes of distillate, a withdrawal of 5,12 volumes of water. The upper layer would have the following composition by volume: benzene 85%, alcohol 13% and water 2%.

Gasoline which is well rectified so as to be entirely distilled between 100–101° C. will produce a ternary mixture having the minimum boiling point (70° C.) which separates by condensation into two layers. The bottom layer, which contains nearly all the water in the mixture, represents 37% of the total volume and contains 18% of water, affording per 100 volumes of distillate a withdrawal of 6.6 volumes of water. The composition by volume of the upper layer, in this instance, would be as follows: gasoline 96%, alcohol 3.5% and water 0.5%.

From the preceding it will be observed that aside from the advantages offered by the latent heat of vaporization and the specific heat, gasoline is more favorable than benzene as concerns the power of withdrawal of the water, but the decantation of its ternary mixture is less advantageous, since for equal amount of water withdrawn, the volume of the bottom layer to be treated will become nearly twice that of the water in the case of benzene.

But the simultaneous use of these two entraining liquids permits one to take advantage of the favourable properties of each liquid. In the case where two entraining liquids are used together, these may be used in equal proportions by volume, although it is to be understood that these proportions may be widely varied, if desired. In fact, during the normal operation in the distilling chamber in which one distills the mixture of the three bodies, water, alcohol, and entraining body, the entraining body which consists of benzene whose ternary azeotropic mixture (water-alcohol-benzene) will boil at some 5° lower than the mixture composed of water, alcohol and gasoline, will preferably occupy the top of the said chamber, as well as the decantation chamber wherein it will set up a favourable decantation of a much-hydrated bottom layer. The gasoline will on the contrary tend to occupy the middle part of the distilling chamber wherein it will act with its great entraining power in order to more rapidly separate the industrial alcohol and to bring it into the upper region in which the benzene is in larger proportion.

On the whole, this will provide an entraining body whose efficacity is on the same order as gasoline itself, and whose action in the decantation chamber itself will be analogous to that of benzene. This will obviously afford a greater facility in the operations, and an economy of fuel or an increased output for a given apparatus.

The invention further relates to a second improvement consisting in the addition of a small quantity of water to the ternary mixture whose boiling point is a minimum either to effect the decantation of the homogeneous liquid, to further a difficult decantation or to modify the composition of the bottom layer, whereby the subsequent treatment of the latter will be simplified.

*Example II.*—When ethyl acetate is used as the entraining liquid, a ternary mixture is formed having a minimum boiling point and which is not capable of decantation. The addition of a small quantity of water causes a separation into two layers; the bottom layer containing the major part of the water is treated in the usual manner. The amount of water added may, if desired, be an amount equal in volume to the amount of ternary mixture produced, although these proportions may be widely varied, as desired.

*Example III*.—When gasoline serves as the entraining liquid, the bottom layer retains in solution a small quantity of this gasoline, or on the order of 10%. By the addition of a very small quantity of water before or after decantation of the ternary mixture supplied from the distilling chamber, we are enabled to separate nearly the whole of the dissolved gasoline, thus simplifying the treatment. The amount of water added may, if desired, be an amount equal in volume to the amount of ternary mixture produced, although these proportions may be widely varied, as desired.

What I claim is:

A process for the manufacture of absolute alcohol from aqueous alcohol, comprising the mixing together of aqueous alcohol, benzene and gasoline being present in sufficient quantity to remove substantially all the water from the alcohol and the benzene and gasoline serving as entraining bodies to form with the alcohol an azetropic mixture containing water when distilled having a minimum boiling point, and in which the said mixture is subjected to distillation in such manner as to obtain absolute alcohol as a residue, the said gasoline having been distilled between 100 and 102° C.

In testimony whereof I have signed this specification.

ELOI RICARD.